Dec. 20, 1955   D. R. MacFARLANE   2,727,951
APPARATUS FOR TESTING TELEPHONE DIALS
Filed Oct. 8, 1952   5 Sheets-Sheet 1

INVENTOR
D. R. MACFARLANE
BY *E. F. Kane*
ATTORNEY

Dec. 20, 1955 D. R. MacFARLANE 2,727,951
APPARATUS FOR TESTING TELEPHONE DIALS
Filed Oct. 8, 1952 5 Sheets-Sheet 2

INVENTOR
D. R. MacFARLANE
BY
ATTORNEY

Dec. 20, 1955   D. R. MacFARLANE   2,727,951
APPARATUS FOR TESTING TELEPHONE DIALS
Filed Oct. 8, 1952   5 Sheets-Sheet 3
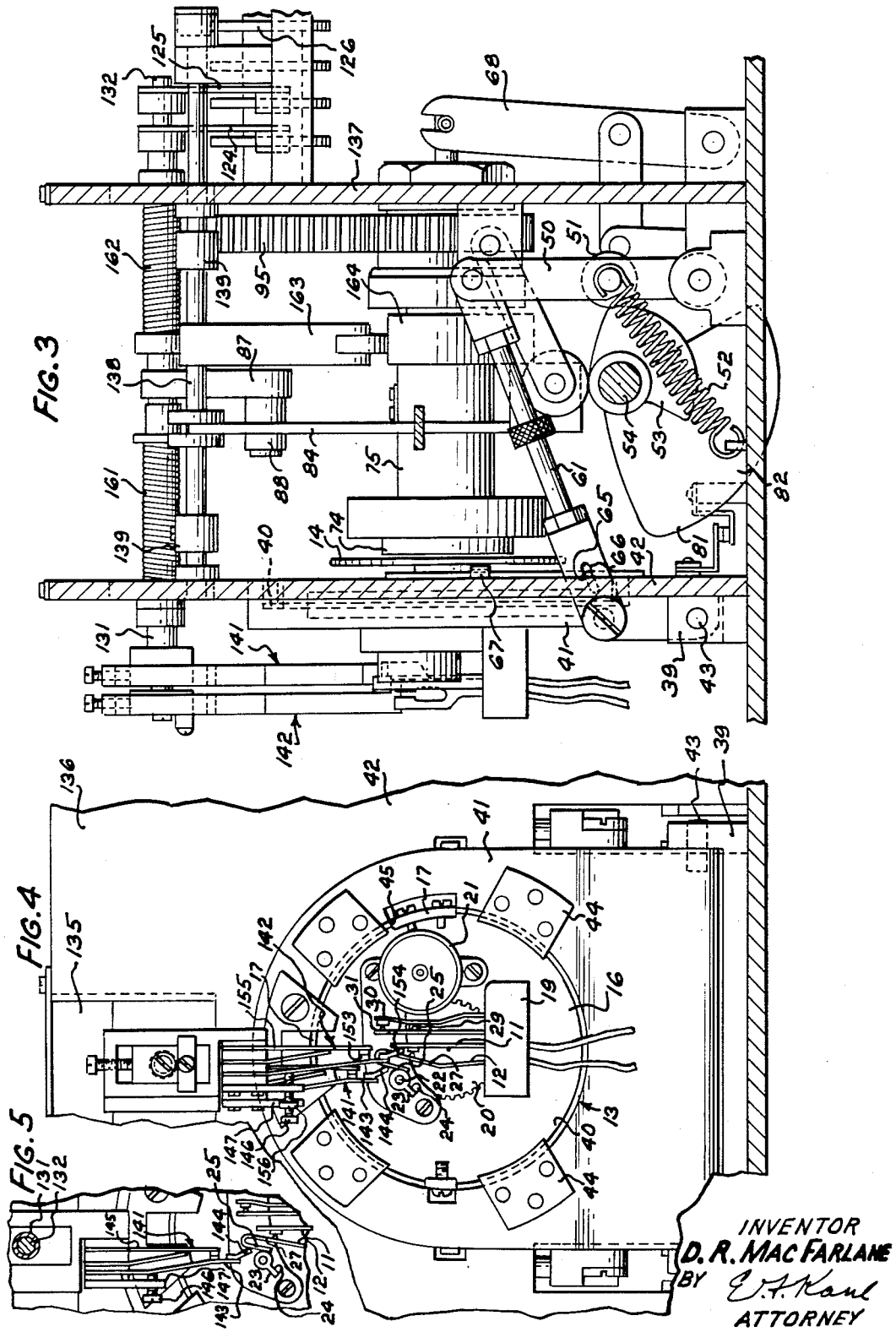
INVENTOR
D. R. MacFARLANE
BY
ATTORNEY

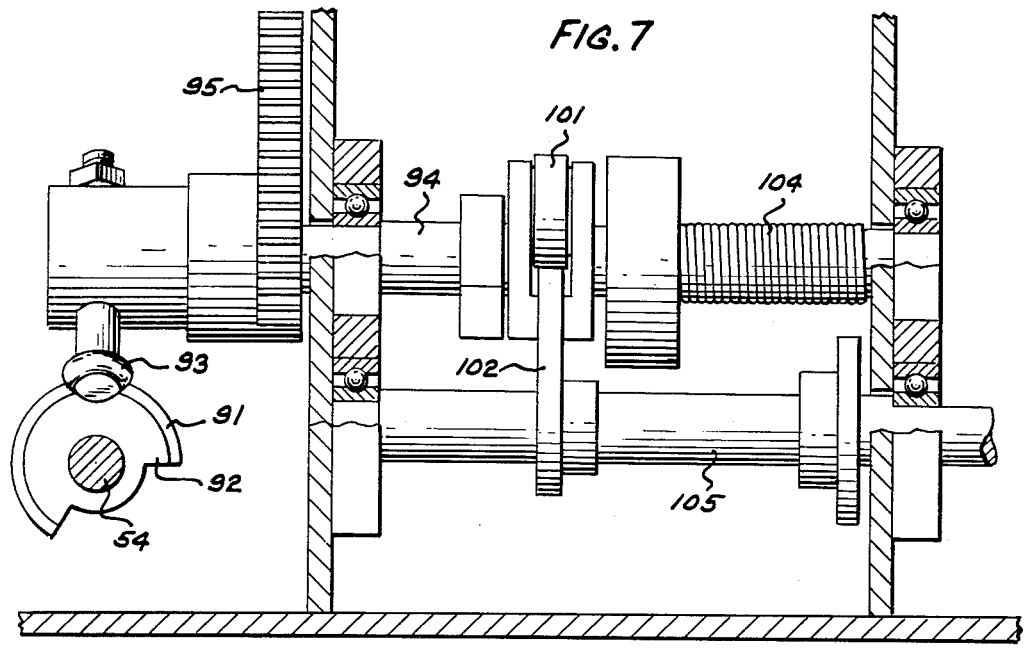
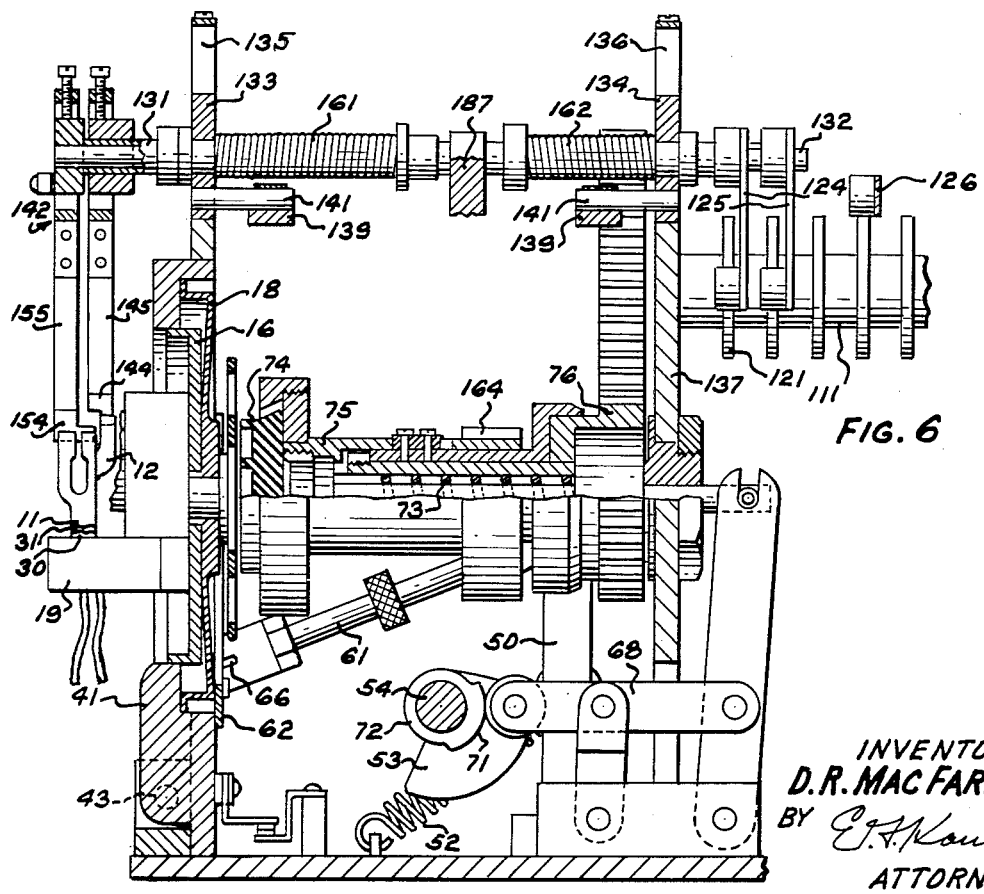

Dec. 20, 1955  D. R. MacFARLANE  2,727,951
APPARATUS FOR TESTING TELEPHONE DIALS
Filed Oct. 8, 1952  5 Sheets-Sheet 5
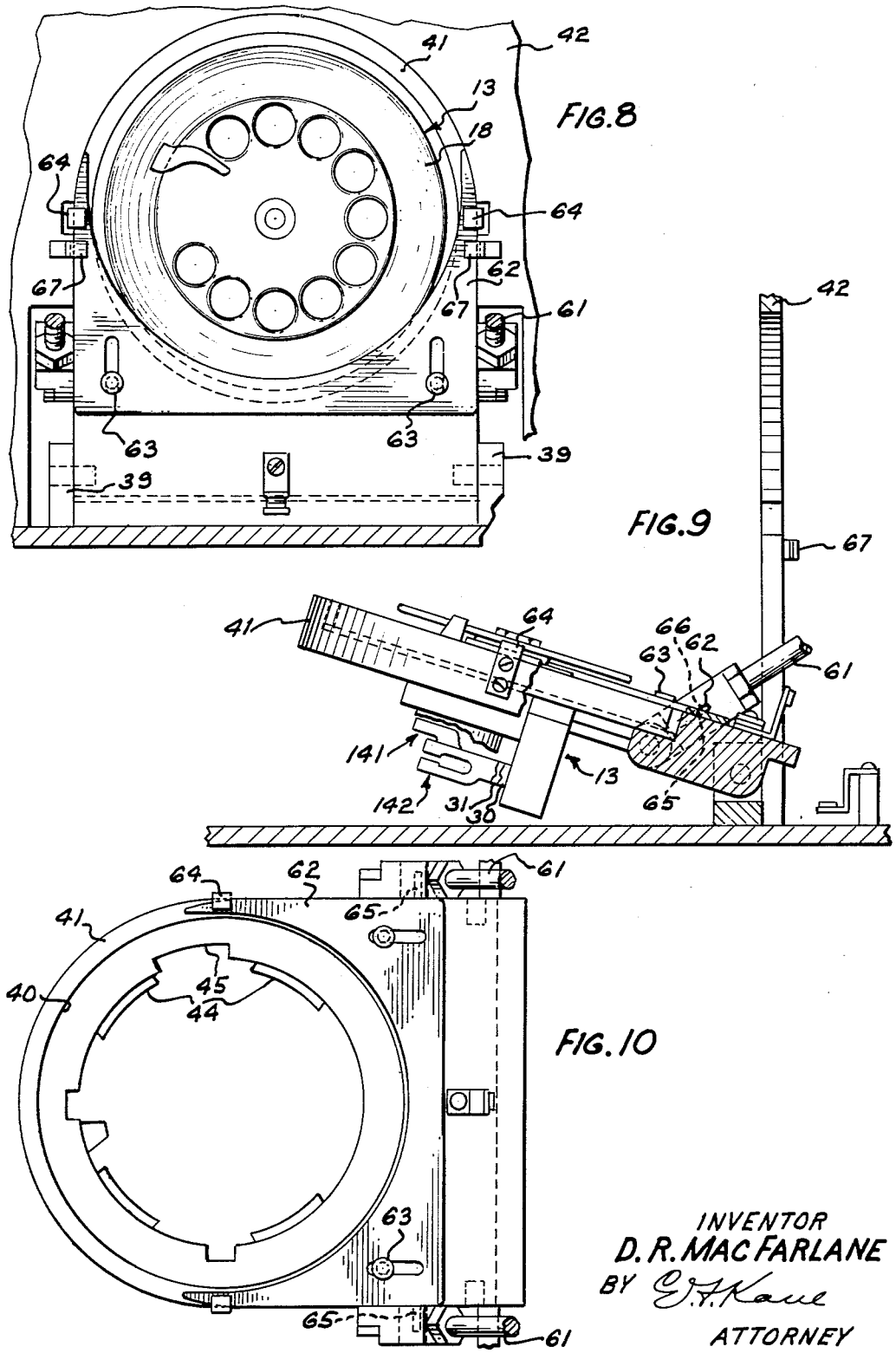
INVENTOR
D. R. MACFARLANE
BY
ATTORNEY

United States Patent Office 2,727,951
Patented Dec. 20, 1955

2,727,951

APPARATUS FOR TESTING TELEPHONE DIALS

Donald R. MacFarlane, Indianapolis, Ind., assignor to Western Electric Company, Incorporated, New York, N. Y., a corporation of New York Application October 8, 1952, Serial No. 313,653

11 Claims. (Cl. 179—175.2)

This invention relates to apparatus for testing articles, and more particularly to apparatus for testing telephone dials, and has for an object thereof the provision of new and improved apparatus for testing dials.

A further object of the invention is to provide testing apparatus in which telephone dials may be quickly and certainly inserted.

A testing apparatus illustrating certain features of the invention may include a gripper mounted rotatably on a horizontal axis, a housing and a door in the housing having a socket designed to receive and move a dial to be tested into engagement with the gripper. As the door is moved from an open position, its loading position, to a closed position, its operative position, a latch is moved over the dial to retain the dial in the socket. As the door reaches its closed position, a testing feeler for engaging a contact spring of the dial located outside the door is swung and lowered across the door to proper position for engaging the contact spring. When the test is over, the feeler is raised and swung out of the path of the door and the door is moved to its open position, the latch being withdrawn simultaneously therewith to permit the dial to be removed from the socket.

A complete understanding of the invention may be obtained from the following detailed description of an apparatus forming a specific embodiment thereof, when read in conjunction with the appended drawings, in which Fig. 1 is a fragmentary, plan view of an apparatus forming one embodiment of the invention;

Fig. 3 is a fragmentary, vertical section taken along line 3—3 of Fig. 1;

Fig. 4 is a fragmentary, front elevation taken along line 4—4 of Fig. 1;

Fig. 5 is a fragmentary, vertical section taken along line 5—5 of Fig. 1;

Fig. 6 is a fragmentary, vertical section taken along line 6—6 of Fig. 1;

Fig. 7 is a fragmentary, vertical section taken along line 7—7 of Fig. 1;

Fig. 8 is a fragmentary elevation taken along line 8—8 of Fig. 1;

Fig. 9 is a fragmentary, vertical section taken along line 9—9 of Fig. 1; and

Fig. 10 is a fragmentary top plan view of a portion of the apparatus shown in Fig. 1.

Figure 1:
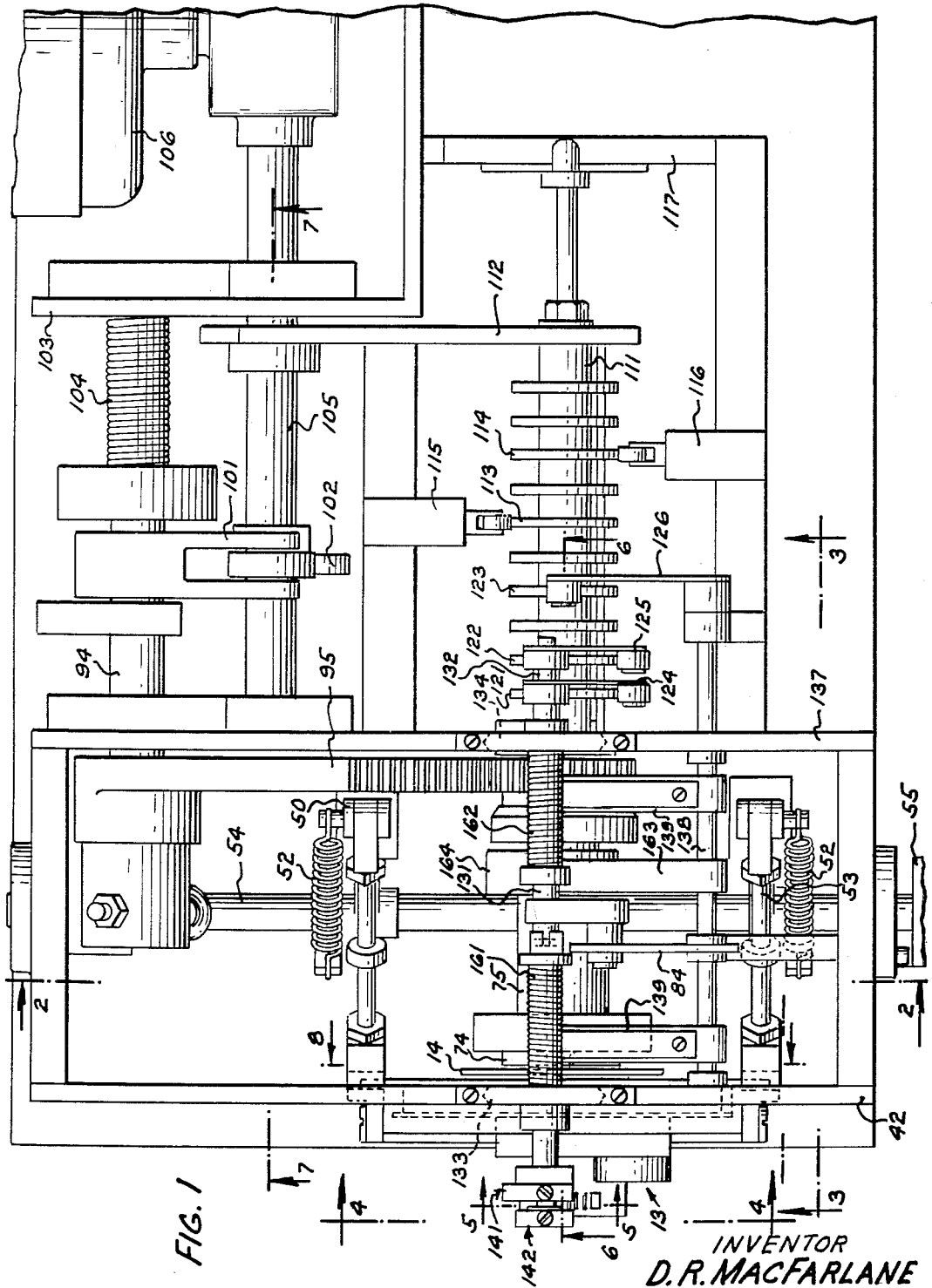

Referring now in detail to the drawings, there is shown therein an apparatus for testing strengths of contact springs 11 and 12 (Figs. 4 and 6) of a dial 13, which includes a finger wheel 14 fixed to a shaft 15 rotatable in a mounting plate 16 provided with lugs 17 and supporting a dial number plate 18, a support 19 of the contacts 11 and 12, gearing 20 and a governor 21. The finger wheel drives a shaft 22 through the gearing 20. A spacing finger 23 mounted loosely on the shaft 22 rotates with the shaft whenever nothing obstructs the finger, but does not rotate therewith when the finger strikes the end 27 of the contact spring 12 when rotated in one direction or a stop 24 when rotated in the opposite direction. A cam (not shown) of the dial fixed to the shaft 22 engages a hook 25 of the spring 12 and pushes the spring 12 to the right, as viewed in Fig. 4, when a lobe thereon engages the hook. When the shaft 22 is rotated in a counterclockwise direction, the finger 23 rests against the stop 24 and the spring 11 keeps in contact with the spring 12, which is moved back and forth by the cam fixed to the shaft 22. When the shaft 22 is rotated in a clockwise direction, the lobe on the cam and the finger 23 travel together until the finger engages the shoulder 27 of the spring 12, the lobe pushing the springs 11 and 12 to the right so that the end of the finger clears the spring 11 and comes to rest against the shoulder 27 of the spring 12 in a position keeping the spring 11 from following the spring 12 as the shaft 22 continues to rotate and a dwell on the cam engages the hook 25. Each time this occurs as the shaft 22 and the cam thereon continue to rotate, contact between the springs 11 and 12 is broken. A pin 29 fixed to the gearing 20 engages a contact spring 30 and keeps it out of engagement with a contact spring 31 when the dial is in its normal position, and when the dial is rotated the pin 29 is moved away from the spring 30 so that the spring 30 moves into engagement with the spring 31 until the dial comes back to its normal position.

The dialing mechanism 13 may be inserted into a socket 40 (Figs. 4 and 6) formed in a holder 14 hinged to stationary lugs 39 of the testing apparatus by pins 43. The rim of the plate 16 fits against stop lugs 44 on the holder 41 movable in a housing wall 42, and the lugs 17 on the plate 16 fit snugly into slots 45 formed in the holder to orient the dialing mechanism in the holder. Levers 50 carrying cam followers 51 (Figs. 1 and 3) are urged in a counterclockwise direction, as viewed in Fig. 3, by tension springs 52 to maintain the followers 51 against cams 53 keyed to a shaft 54 rotatable by a manual crank 55. The shaft is rotatably supported by walls 56 and 57 of the apparatus, and is limited in its turning movement by a pin 58 secured to the wall 57 and a shoulder 59 projecting from the crank. Adjustable links 61 secure the holder 41 to the levers 50. When the crank 55 is rotated in a clockwise direction, as viewed in Fig. 3, the cams 53 permit the springs 52 to swing the holder to a substantially horizontal position, the loading position thereof.

As the holder is moved to its loading position, a latching plate 62 (Fig. 8) mounted slidably by guides 63 and leaf spring guides 64, is slid downwardly by pins 65 fixed to the latching plate and projecting into guide slots 66 formed in the links 61. The latching plate is moved downwardly by this movement of the holder sufficiently to completely uncover the socket 40 in the holder so that the dialing mechanisms may be removed from and inserted into the socket 40. When the links 61 move the holder back from its loading position to its operative position, the links slide the latching plate up over the lower portion of the socket 40 to keep the dialing mechanism seated in the socket. The leaf spring guides 63 permit the latching plate to slide over the dial number plate 18, and, as the holder is pulled to its operative position, the latching plate is pressed by resiliently faced lugs 67 fixed to the housing firmly against the dial number plate to seat it in the socket 40.

Figure 2:
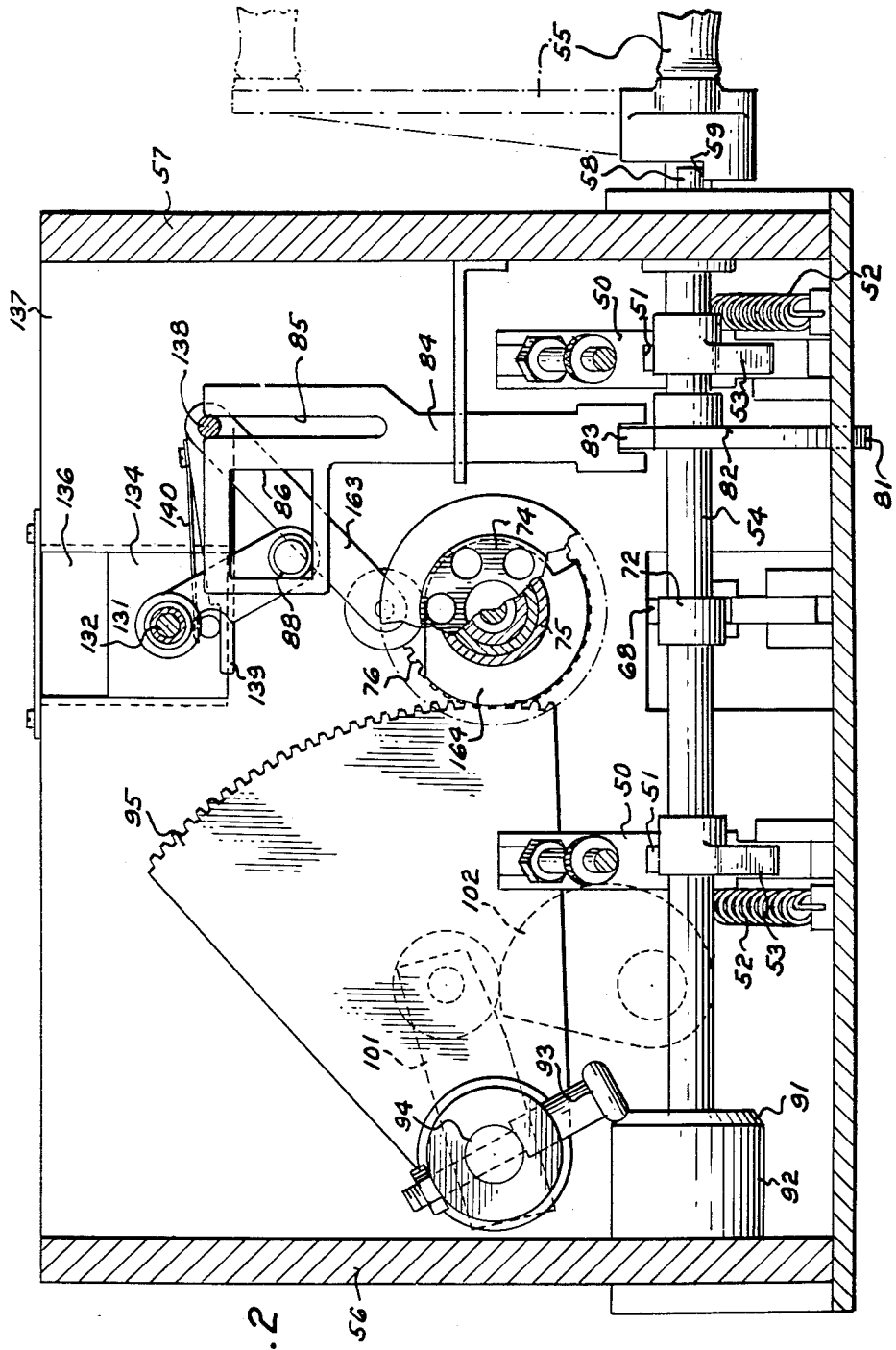
Fig. 2 is a fragmentary, vertical section taken along line 2—2 of Fig. 1.

When the shaft 54 is rotated to swing the holder 41 to its operative position, it moves a lobe 71 of a cam 72 (Figs. 2 and 6) out of engagement with a follower linkage 68 to permit a compression spring 73 to urge against the dial 14 a rubber gripper 74 splined to a sleeve 75 having a gear 76 fixed thereto. The gripper 74 holds the dial 13 against rotation relative to the sleeve 75. At the end of such rotation of the shaft 54, a lobe 81 of a cam 82 secured to the shaft 54 is moved out of engagement with a follower 83 carried by a guide plate 84 having a slot 85 and a generally rectangular cam opening 86 to permit an arm 87 urged in a clockwise direction, as viewed in Fig. 2, carrying a follower roll 88 to move the guide plate downwardly. Also, such movement of the shaft 54 moves a lobe 91 (Figs. 2 and 7) of a cam 92 into engagement with a follower 93 projecting from a shaft 94 to turn the shaft 94 in a counterclockwise direction, as viewed in Fig. 2, to swing a gear segment 95 to its uppermost position before the gripper 74 engages the dial 13. Then, after the gripper engages the dial, the shaft 54 moves the lobe 91 out of engagement with the follower 93.

A cam follower 101 (Figs. 1 and 2) fixed to the shaft 94 and wall 103 of the housing is urged by a torsion spring 104 toward a cam 102 fixed on a shaft 105 driven continuously by an electric motor 106 to oscillate the gear segment 95 continuously except when the cam 92 holds the gear segment 95 at the upper end of its travel. The shaft 105 drives a cam shaft 111 continuously through gearing 112, and cams 113 and 114 periodically actuate switches 115 and 116, respectively, of a test set 117 of a well known type as the cams 113 and 114 are rotated by the cam shaft. Cams 121, 122 and 123 also are fixed to the cam shaft, and actuate followers 124, 125 and 126, respectively, as these cams are rotated. The follower 124 is secured rigidly to a sleeve 131 mounted rotatably on a shaft 132, and the follower 125 is secured rigidly to the shaft 132. The sleeve 131 is mounted rotatably in rectangular plates 133 and 134 slidable vertically in rectangular openings 135 and 136 formed in the wall 42 and a wall 137, respectively. The follower 126 is rigidly secured to a shaft 138 (Figs. 1 and 2) connected by arms 139 and leaf springs 140 to pins 141 secured to the rectangular plates 133 and 134.

Feelers 141 and 142 (Figs. 4, 5 and 6) are fastened to the sleeve 131 and the shaft 132, respectively. The feeler 141 includes a contact spring 143 having a tip 144 composed of insulating material normally biased into engagement with a contact spring 145 by an adjustment screw 146 projecting through a bracket 147 fixed against movement relative to the sleeve 131. Similarly the feeler 142 includes a contact spring 153 having a tip 154 and normally biased into engagement with a contact spring 155 by an adjustment screw 156 carried by a bracket 157 fixed to the shaft 132. The tip 144 is designed to engage the hook 25, and the tip 154 is designed to engage the contact spring 11. Torsion springs 161 and 162 secured to the shaft 131 and the sleeve 132, respectively, and to the follower arm 87 bias the feelers 141 and 142 in clockwise directions, as viewed in Fig. 4, to maintain the followers 124 and 125 against the cams 121 and 122. A cam follower arm 163 (Fig. 3) fixed to the shaft 138 is actuated by a cam 164 fixed to the sleeve 75 to oscillate the shaft 138 to raise and lower the plates 133 and 134.

*Operation*

With the door or holder 41 in its open or loading position, a dial 13 is placed in the socket 40, the latching plate 62 being slid down in this position by the pins 65 so that the arcuate cutaway portion of the latching plate is aligned with the socket 40. The cutaway portion of the latching plate is of the same diameter as that of the widest portion of the socket so that the socket is completely uncovered by the latching plate at this time. The crank 55 is turned manually to turn the cams 53 to close the door 41, and as the door is closed, the latching plate is slid upwardly on the door by the links 61 and the pins 65 to cover the lower portions of the dial number plate 18, thereby keeping the dial 13 seated in the socket 40. As the holder reaches its closed position the lugs 67 press the latching plate firmly against the dial number plate to hold it firmly on the socket 40.

After the holder 41 has been moved to its closed position, the dial is connected to the test set 117 and the shaft 54 is turned further, and the lobe 81 of the cam 82 (Fig. 2) moves out from under the follower 83 on the guide plate 84, and the guide plate 84 is lowered by gravity and the downward pressure of the follower roll 88. During the first portion of the movement of the guide plate, the plates 133 and 134 (Figs. 2 and 6) and the sleeve 131 and the shaft 132 are kept in their raised positions by the action of the spring 162 on the arm 87, which, being rigidly secured to the sleeve 131, is pivoted in a clockwise direction as viewed in Fig. 2. This swings the feelers 141 and 142 from positions clear of the path of the door 41 to positions in front of the door with the feeler 141 above and just to the left, as viewed in Fig. 4, of the hook 25 of the contact spring 12 and the feeler 142 above and just to the left of the contact spring 11.

During the next portion of the movement of the guide plate 84 (Figs. 2, 3 and 6) downwardly, the shaft 131, the sleeve 132 and the elements carried thereby move downwardly with the guide plate to move the tips 144 and 154 of the feelers just above facing relationships with the hook 25 and the upper end of the contact spring 11, respectively, ready to be lowered slightly and swung into engagement with these portions of the contact springs. At this time, the cam 72 (Figs. 2 and 6) permits the spring 73 to move the rubber gripper 74 into engagement with the finger wheel 14, and the spring 73 so moves the gripper. The shaft 54 then moves the lobe 91 of the cam 92 out of engagement with the follower 93, and the spring 104 moves the follower 101 into engagement with the cam 102. Thus, the gear segment 95 always is in its raised position when the gripper 74 is locked with the finger wheel 14, and subsequent movement of the dial finger wheel is in accordance with the movement of the cam 102.

The cam 102 causes the gear segment 95 to move downwardly to rotate the sleeve 75 to turn the finger wheel 14 of the dial 13 through a predetermined arc corresponding to one movement of the finger wheel when in use, to dial one number, for example, to dial "0." At the end of the downward movement of the gear segment 95, a dwell of the cam 102 engages the follower 101, and the finger wheel is held in the position to which it has been turned. Just after the finger wheel reaches this position, the cam 164 actuates the follower arm 163 to lower the supporting plates 133 and 134 to move the tips 144 and 154 to just below the levels of the hook 25 and the upper portion of the spring 11. The cams 121 and 122 then swing the feelers 141 and 142 counterclockwise into engagement with the hook 25 and the spring 11, and, the time depending on the relative strength of each of the contact springs 11 and 12, the contact springs 11 and 12 open the contacts of the feelers which are suitably connected to the test set 117. At the start of the flexing of the contact springs, the cam 114 closed the switch of the test circuit 117 to begin measuring the time from the start of the flexing of the springs 11 and 12 until the springs 11 and 12 open the contacts of the feelers. Thus, the strength of each of the contacts 11 and 12 is determined by measuring individually the time of separation of the respective contacts 142 and 141.

After the feelers are swung counterclockwise, they are swung back and the cam 123 (Fig. 1) actuates the shaft 138 to raise the plates 133 and 134 to raise the feelers 141 and 142 above the contact springs 11 and 12. The cam 102 then swings the gear segment 95 upwardly to drive the dial 13 through the sleeve in the return direction, and the finger 23 and the dial cam (not shown) cause the contact springs 11 and 12 to repeatedly make and break. At the start of this movement, a lobe of the cam 164 moves the follower 163 to a position keeping the plates 133 and 134 raised sufficiently that the tips of the feelers 141 and 142 do not engage the contact springs 11 and 12 as the cams 121 and 122 continue to oscillate the feelers. Also, the follower 126 is held out of engagement with the cam 123 while the lobe of the cam 164 is in engagement with the follower 163. The lobe of the cam 164 remains under the follower 163 except while the gear segment 95 is in its lowermost position so that the feelers 141 and 142 can engage the contact springs 11 and 12 only while the finger wheel 14 is not moving, and, while the dwell of the cam 102 engages the follower 101, the dwell of the cam 164 engages the follower 163.

After the cam 164 has caused the feelers 141 and 142 to be raised above the contact springs 11 and 12, the gear segment 95 drives the finger wheel 14 back to its starting position at a fixed rate of speed, so that the cam on the shaft 22 (Fig. 4) makes and breaks the contact springs 11 and 12 and the test set 117 tests the relation between the time and contact springs 11 and 12 are made and the time they are open.

After the test is completed, the crank 55 (Fig. 2) is actuated manually to turn the shaft 54. This moves the gear segment 95 to its uppermost position, if necessary, and moves the gripper 74 out of engagement with the finger wheel 14. The cam 82 is turned by the shaft 54 to raise the guide plate 84, which only lifts the feelers 141 and 142 through the follower roll 88, the arm 87, the shaft 132 and the sleeve 131 until the plates 133 and 134 reach the upper ends of the openings 135 and 136 in the walls 42 and 137, and then, on further movement of the guide plate 84, swings the follower arm 87 in a counterclockwise direction, as viewed in Fig. 2. The roll 88 moves to the right along the bottom of the opening 86 in the guide plate 84 during this latter movement of the plate 84, and the arm 87 turns the sleeve 131 to swing the feeler 141 completely out of the path of the door 41. The sleeve 131 through the pin and slot connection with the shaft 132 (Fig. 1) turns the shaft 132 sufficiently to swing the feeler 142 completely out of the path of the door 41. This pin and slot connection between the shaft 132 and the sleeve 131 permits independent testing movements of the shaft 132 and the sleeve 131 while the feelers are testing the contact springs 11 and 12, but sufficiently limits relative movement between the sleeve and shaft to swing the feeler 142 out of the path of the door when the feeler 141 is so swung.

Further movement of the shaft 54 actuates the levers 50 to swing the door 41 in a counter-clockwise direction, as viewed in Fig. 3, to open the door. As the door is opened, the latching plate 62 is pulled by the pins 65 and slots 66 to its retracted position completely uncovering the socket 40. The dial then may be removed.

The apparatus keeps the dial 13 in proper position while the door 41 is being closed, positively keeps the dial from being tipped out of the socket 40 and maintains the dial in this position throughout the testing of the dial. The apparatus is easily loaded and unloaded and the door is opened and closed without interference from the feelers 141 and 142, which must extend substantially half way across the door when they are in their testing positions.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A testing apparatus, which comprises a holder movable between a loading position and a testing position for holding a telephone dial to be tested, means for moving the holder between said positions, a latch operable by the holder-moving means for holding the dial in the holder as the holder is moved toward its testing position, a feeler for engaging the dial to test it, means for swinging the feeler between a position in the path of the holder and a retracted position out of the path of the holder, and means operable by the holder-moving means for actuating the feeler-swinging means to move the feeler to its testing position after the holder is moved to its testing position and move the feeler to its retracted position before the holder is moved from its testing position.

2. A testing apparatus, which comprises a holder movable between a loading position and a testing position for holding a telephone dial to be tested, selectively operable means for moving the holder between said positions, a latch operable by the selectively operable means for holding the dial in the holder, a feeler for engaging the dial to test it, means for swinging the feeler between a position in the path of the holder and a retracted position out of the path of the holder, means for moving the feeler-swinging means toward and away from the holder, and means for actuating the feeler-swinging means and the moving means to move the feeler to a testing position after the holder is moved to its testing position and move the feeler to a retracted position before the holder is moved from its testing position.

3. A testing apparatus, which comprises a housing having an opening therein, a door having a socket therethrough for holding a telephone dial and movable between a loading position away from the opening in the housing and a testing position in the opening in the housing, means selectively operable for moving the door to its loading position and to its testing position, a feeler for engaging the dial, means for swinging the feeler from a retracted position clearing the opening to a testing position extending across the opening, means for oscillating the feeler to test the dial, and means operable by the selectively operable means for maintaining the feeler in its retracted position while the door is away from its testing position and maintaining the feeler in its testing position while the door is in its testing position.

4. A testing apparatus, which comprises a housing having an opening therein, a door having a socket for holding a telephone dial therethrough movable between a loading position away from the opening in the housing and a testing position in the opening in the housing, means for moving the door to its loading position and to its testing position, a feeler for engaging the dial, means for swinging the feeler from a retracted position clearing the opening to a testing position extending across the opening, and means operable by the door-moving means for maintaining the feeler in its retracted position while the door is away from its testing position and maintaining the feeler in its testing position while the door is in its testing position.

5. A testing apparatus for telephone dials having contact springs and a finger wheel which comprises a housing having an opening in a wall thereof, a door mounted pivotally in the opening and being provided with a bore extending therethrough and a counterbore extending from the inner face thereof to form a socket for receiving such a telephone dial in a position in which contact springs thereof are located on the outside of the door and a finger wheel thereof is located at the inner side of the door, a gripper for engaging the finger wheel when the door is closed, means for driving the gripper, manually operable means for opening and closing the door, a latch operable by the manually operable means for holding the dial in the socket as the door is closed, a feeler mounted rotatably and movable toward and away from one of the contact springs, feeler-moving means operable by the manually operable means for moving the feeler toward the dial and swinging it across the door into proximity to one of the contact springs after the door has been closed, said feeler-moving means serving to swing and move the feeler out of the path of the door as the door is opened, and means for swinging the feeler into testing engagement with one of the contact springs.

6. A testing apparatus for telephone dials having contact springs and finger wheels, which comprises a housing having an opening in a wall thereof, a door mounted pivotally in the opening and being provided with a bore extending therethrough and a counterbore extending from the inner face thereof to form a socket for receiving such a telephone dial in a position in which contact springs thereof are located on the outside of the door and a finger wheel thereof is located at the inner side of the door, a gripper for engaging a finger wheel of the dial when the door is closed, means for driving the gripper, manually operable means for opening and closing the door, a feeler mounted rotatably and movable toward and away from one of the contact springs, a feeler-moving means operable by the manually operable means for moving the feeler toward the dial and swinging it across the door into proximity to one of the contact springs after the door has been closed, said feeler-moving means serving to swing and move the feeler out of the path of the door as the door is opened, and means for swinging the feeler into testing engagement with one of the contact springs.

7. A testing apparatus for telephone dials having contact springs and finger wheels, which comprises a housing having an opening therein, a door movable between an open position and a closed position for holding such a telephone dial in a position in which a finger wheel of the dial is at the inside of the door and a contact spring of the dial is at the outside of the door, means for opening and closing the door, a shaft, bearing means slidably mounted on the housing supporting the shaft rotatably, a feeler secured to the shaft, means urging the bearing means toward the opening in the housing, means urging the shaft to a position in which the feeler extends across the opening in the housing, cam means for periodically turning the shaft against the shaft-urging means to swing the feeler into engagement with the contact spring, a follower arm secured to the shaft, a guide plate engaging the follower arm, and a cam operable by the door-opening-and-closing means for actuating the guide plate so as to move the bearing means away from the opening and swing the feeler out of the path of the door as the door is opened, said cam serving to actuate the guide plate so as to swing the feeler across the door and move the bearing means toward the opening in the housing as the door is closed.

8. A testing apparatus for telephone dials having contact springs and finger wheels, which comprises a housing having an opening therein, a door movable between an open position and a closed position for holding such a telephone dial in a position in which a finger wheel of the dial is at the inside of the door and a contact spring of the dial is at the outside of the door, means for opening and closing the door, a shaft, bearing means slidably mounted on the housing supporting the shaft rotatably, a feeler secured to the shaft, means urging the bearing means toward the opening in the housing, means urging the shaft to a position in which the feeler extends across the opening in the housing, cam means for periodically turning the shaft against the urging means to swing the feeler into engagement with the contact spring, cam means for periodically moving the shaft toward and away from the opening, a follower arm secured to the shaft, a guide plate engaging the follower arm, and a cam for actuating the guide plate so as to swing the feeler out of the path of the door as the door is opened, said cam serving to actuate the guide plate so as to swing the feeler across the door as the door is closed.

9. A testing apparatus for telephone dials having contact springs and finger wheels, which comprises a housing having an opening therein, a door movable between an open position and a closed position for holding such a telephone dial in a position in which a finger wheel of the dial is at the inside of the door and a contact spring of the dial is at the outside of the door, means for opening and closing the door, a shaft, bearing means slidably mounted on the housing supporting the shaft rotatably, a feeler secured to the shaft, means urging the bearing means toward the opening in the housing, cam means for periodically moving the shaft toward and away from the opening in the housing, means urging the shaft to a position in which the feeler extends across the opening in the housing, cam means operable in synchronism with the first-mentioned cam means for periodically turning the shaft against the urging means to swing the feeler into engagement with the contact spring, a follower arm secured to the shaft, a guide plate engaging the follower arm, and a cam operable by the door-opening-and-closing means for actuating the guide plate so as to move the bearing means away from the opening and swing the feeler out of the path of the door as the door is opened, said cam serving to actuate the guide plate so as to swing the feeler across the door and move the bearing means toward the opening in the housing as the door is closed.

10. A testing apparatus, which comprises a housing having an opening in a wall thereof, a door mounted pivotally at one end of the opening and movable between an open position extending away from the opening and a closed position extending along the opening, said door having a telephone dial-receiving socket facing the inner side of the door, means for moving the door to said positions thereof, a latching plate mounted slidably on the inner face of the door movable between a position clearing the socket and a position extending across the socket, and means operable in synchronism with the door-moving means for moving the plate to its position clearing the socket as the door is opened and to its position extending across the socket as the door is closed.

11. A testing apparatus, which comprises a housing having an opening in a wall thereof, a rotatable gripper mounted inside the housing in a position facing the opening, a door mounted pivotally at the bottom of the opening and movable between an open position extending substantially horizontally away from the opening and a closed position extending vertically in the opening, said door having a telephone dial-receiving socket facing the inner side of the door, manually operable means for moving the door to said positions thereof, a latching plate mounted slidably on the inner face of the door movable between a position clearing the socket and a position extending across the socket, and means operable in synchronism with the manually operable means for moving the plate to its position clearing the socket as the door is opened and to its position extending across the socket as the door is closed.

References Cited in the file of this patent
UNITED STATES PATENTS

| | | |
|---|---|---|
| 1,759,837 | Brown | May 27, 1930 |
| 1,796,805 | Paulson | Mar. 17, 1931 |
| 2,136,630 | Massoneau | Nov. 15, 1938 |
| 2,267,129 | Paulson | Dec. 23, 1941 |